(No Model.)
O. W. CEDER.
NUT LOCK.
No. 593,081. Patented Nov. 2, 1897.
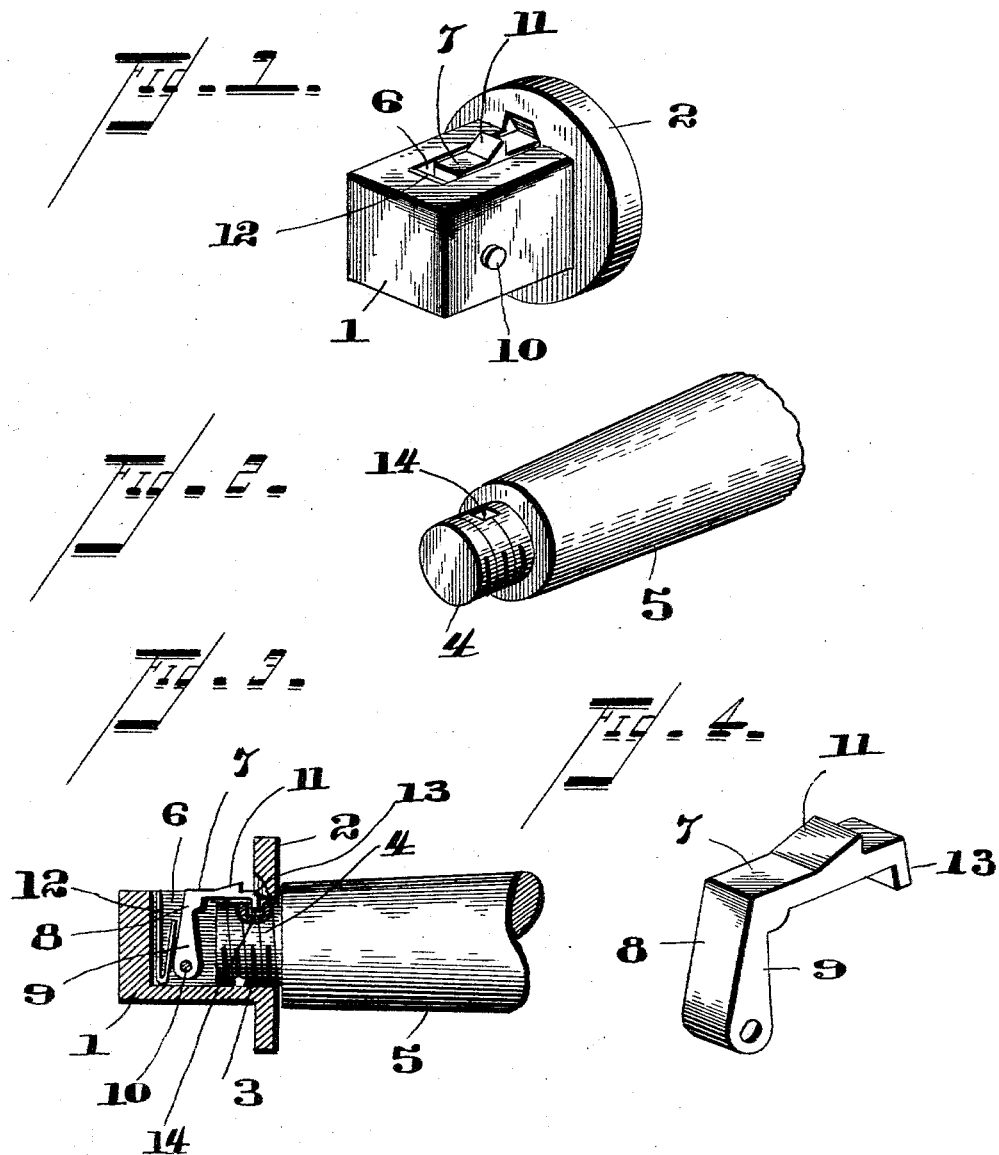
WITNESSES
Marcus L. Byng.
Henry H. Byrne.
INVENTOR,
Oscar W. Ceder.
by John Wedderburn
Attorney

UNITED STATES PATENT OFFICE.

OSCAR W. CEDER, OF LEE, NORTH DAKOTA.

NUT-LOCK.

SPECIFICATION forming part of Letters Patent No. 593,081, dated November 2, 1897.

Application filed December 23, 1896. Serial No. 616,735. (No model.)

*To all whom it may concern:*

Be it known that I, OSCAR W. CEDER, a citizen of the United States, residing at Lee, in the county of Nelson and State of North Dakota, have invented certain new and useful Improvements in Nut-Locks; and I do hereby declare the following to be a full, clear, and exact description of the invention, such as will enable others skilled in the art to which it appertains to make and use the same.

This invention relates to nut-locks, and is designed especially for use upon the spindles of carriages, wagons, and other vehicles. It will, however, be apparent as the description proceeds that said nut-lock may be applied at various points in a variety of ways without departing from the spirit or sacrificing any of the advantages of the invention.

The invention consists of an improved nut-lock embodying certain novel features and details of construction, as hereinafter fully described, illustrated in the drawings, and embodied in the claims.

In the accompanying drawings, Figure 1 is a perspective view of a nut equipped with the improved lock. Fig. 2 is a similar view showing the end of an axle-spindle formed to engage said nut-lock. Fig. 3 is a longitudinal section through the spindle and nut, showing said parts in operative engagement. Fig. 4 is a detail perspective view of the catch.

Similar numerals designate corresponding parts in the several figures of the drawings.

Referring to the drawings, 1 designates an ordinary wagon-nut having the flat wrench-engaging surfaces and provided at its inner end with the flange 2. The nut 1 is provided with an internally-threaded bore 3 to screw upon the threaded reduced end 4 of the spindle 5. The nut 1 is provided at one side with an aperture 6 of a substantially rectangular form, in which is arranged the horizontal arm 7 of an elbow-catch 8. The other arm 9 of said catch extends inwardly into the bore of the nut, where it is journaled at its extremity on a transverse pin 10, extending through the opposite side walls of the nut and secured therein in any convenient manner.

The catch 8 is provided externally of the arm 7 with a projection 11, which may be engaged for rocking the catch on its fulcrum, and said catch is given a normal tendency by means of a leaf-spring 12, arranged in the outer end of the nut and bearing against the inwardly-extending portion 9 of the catch 8.

The catch is provided at its free end with an inwardly-projecting lip 13, which is adapted to snap into engagement with a socket 14 in the reduced end 4 of the spindle.

In operation the catch is rocked, so as to lift the lip 13, and is then screwed upon the spindle until said lip snaps into the socket 14, thus holding the nut firmly on the spindle. When it is desired to reverse the nut, the catch 8 is again rocked, so as to lift the lip 13 out of the socket, whereupon the nut may be turned on the spindle.

It will be apparent that the threads on the nut and on the spindle may be omitted, so that the nut may be slid inward on the spindle until the catch 8 engages in the notch 14.

It will also be understood that the improved lock may be used in connection with any desired form of nut without departing from the scope of this invention.

Having thus described the invention, what is claimed as new is—

1. A nut provided with an aperture in one side, in combination with a catch fulcrumed at one end within the nut on a pin crossing the bore of the nut and having an elbow extension working adjacent to one side of the nut and in a recess therein, a lip projecting inward from the free end of said extension for engagement with a socket in the article embraced by the nut, a spring for holding said catch in its operative position, and an external projection on the catch for facilitating the rocking thereof, substantially as described.

2. A nut provided with an aperture in one side, in combination with an elbow-shaped catch having one arm working in said aperture, and its other arm extending inward, and fulcrumed within the nut, and a leaf-spring for holding said catch in its operative position, an external projection on said catch for facilitating the rocking thereof, and a lip projecting inward from the free end of said catch and adapted to engage a socket in the article embraced by the nut, substantially as described.

In testimony whereof I have signed this specification in the presence of two subscribing witnesses.

OSCAR W. CEDER.

Witnesses:
 CHARLES COLSON,
 J. G. GUNDERSON.